(12) United States Patent
Fan et al.

(10) Patent No.: US 10,043,153 B2
(45) Date of Patent: Aug. 7, 2018

(54) PATTERN-BASED PRODUCT IDENTIFICATION WITH FEEDBACK

(71) Applicant: International Business Machines Corporation, Armonk, NY (US)

(72) Inventors: Liya Fan, Beijing (CN); Nicholas C. M. Fuller, North Hills, NY (US); Jian Qiu, Xi'an (CN); Zhe Zhang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 14/339,724

(22) Filed: Jul. 24, 2014

(65) Prior Publication Data

US 2016/0026968 A1    Jan. 28, 2016

(51) Int. Cl.
*G06F 17/30* (2006.01)
*G06Q 10/08* (2012.01)

(52) U.S. Cl.
CPC .................. *G06Q 10/087* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 5,671,412 A | 9/1997 | Christiano | |
| 5,758,068 A | 5/1998 | Brandt et al. | |
| 6,988,134 B2 | 1/2006 | Thorpe et al. | |
| 6,993,743 B2 | 1/2006 | Crupi et al. | |
| 7,480,834 B2 * | 1/2009 | Blaisdell | G06F 11/008 714/47.2 |
| 7,506,038 B1 * | 3/2009 | Perrone | G06F 8/60 709/220 |
| 8,321,352 B1 | 11/2012 | Rameshkumar et al. | |
| 8,341,751 B2 | 12/2012 | Wilson | |
| 8,346,752 B2 | 1/2013 | Sirota et al. | |
| 8,407,176 B2 * | 3/2013 | Boettcher | H04L 41/142 706/47 |
| 8,473,607 B2 | 6/2013 | Enscoe et al. | |
| 8,539,445 B2 | 9/2013 | Gangemi et al. | |
| 8,601,540 B2 | 12/2013 | Eddahabi et al. | |
| 9,098,333 B1 * | 8/2015 | Obrecht | G06F 11/30 |

(Continued)

FOREIGN PATENT DOCUMENTS

WO    0205184 A2    1/2002

OTHER PUBLICATIONS

Aura et al., "Software License Management with Smart Cards", USENIX Workshop on Smartcard Technology, Chicago, Illinois, USA, May 10-11, 1999.

(Continued)

*Primary Examiner* — Tarek Chbouki
(74) *Attorney, Agent, or Firm* — Stephen Darrow; David B. Woycechowsky

(57) ABSTRACT

Automatically associating information technology resource patterns with specific information technology products by receiving a set of data about information technology assets, matching a subset of that data to a pattern in a set of patterns, determining that the subset of the data represents a product associated with that pattern, reporting this determination; receiving feedback on the accuracy of the determination, and updating pattern set information in response to that feedback.

7 Claims, 6 Drawing Sheets

(56) References Cited

U.S. PATENT DOCUMENTS

| | | | |
|---|---|---|---|
| 2004/0204988 A1* | 10/2004 | Willers | G06Q 30/02 |
| | | | 705/14.56 |
| 2005/0120111 A1* | 6/2005 | Bailey | G06F 11/3409 |
| | | | 709/224 |
| 2005/0289072 A1 | 12/2005 | Sabharwal | |
| 2006/0161765 A1* | 7/2006 | Cromer | G06F 9/4416 |
| | | | 713/2 |
| 2006/0225124 A1* | 10/2006 | Kolawa | G06F 21/6218 |
| | | | 726/1 |
| 2007/0032992 A1* | 2/2007 | Trowbridge | G06F 11/3438 |
| | | | 702/193 |
| 2008/0059953 A1* | 3/2008 | Savva | G06F 9/44505 |
| | | | 717/121 |
| 2008/0148253 A1* | 6/2008 | Badwe | G06F 21/10 |
| | | | 717/174 |
| 2008/0162308 A1 | 7/2008 | Sharma | |
| 2008/0228513 A1 | 9/2008 | McMillan et al. | |
| 2009/0150906 A1 | 6/2009 | Schmidt et al. | |
| 2010/0185686 A1* | 7/2010 | Weigert | G06F 21/10 |
| | | | 707/803 |
| 2010/0192127 A1* | 7/2010 | Son | G06F 8/36 |
| | | | 717/121 |
| 2010/0241616 A1* | 9/2010 | Murphy | G06F 11/004 |
| | | | 707/661 |
| 2010/0306732 A1 | 12/2010 | Zhu | |
| 2011/0088011 A1 | 4/2011 | Ouali | |
| 2011/0314369 A1 | 12/2011 | Wei et al. | |
| 2012/0117189 A1* | 5/2012 | Lam | G06Q 30/0251 |
| | | | 709/217 |
| 2012/0185821 A1 | 7/2012 | Yaseen et al. | |
| 2012/0246086 A1 | 9/2012 | Mazza et al. | |
| 2012/0304248 A1* | 11/2012 | Watts | G06Q 30/06 |
| | | | 726/1 |
| 2013/0031158 A1 | 1/2013 | Salsburg | |
| 2013/0238780 A1* | 9/2013 | Devarakonda | G06F 9/5072 |
| | | | 709/224 |
| 2013/0297560 A1* | 11/2013 | Becker | G06Q 40/06 |
| | | | 707/609 |
| 2014/0108403 A1 | 4/2014 | Chen et al. | |
| 2014/0122348 A1 | 5/2014 | Fuller et al. | |
| 2014/0149060 A1* | 5/2014 | Meduna | G06F 1/3206 |
| | | | 702/94 |
| 2015/0230108 A1* | 8/2015 | Sridhara | H04W 24/08 |
| | | | 455/405 |

OTHER PUBLICATIONS

Challagulla et al., Empirical Assessment of Machine Learning Based Software Defect Prediction Techniques, Accepted: May 11, 2007, International Journal on Artificial Intelligence Tools, vol. 17, Issue 2, Apr. 2008.

Chaturvedi et al., "Automating Pattern Discovery for Rule Based Data Standardization Systems", ICDE Conference 2013, pp. 1231-1241, 978-1-4673-4910-9/13, doi: 10.1109/ICDE.2013.6544912.

Chu et al., "Semantics Based Enterprise Modeling for Automated Service Discovery and Service Composition", 2007 IEEE Asia-Pacific Services Computing Conference, 0-7695-3051-6/07, © 2007 IEEE, DOI 10.1109/APSCC.2007.23, pp. 439-445.

Langsworth et al., "Method for Automated Device Group Creation", an IP.com Prior Art Database Technical Disclosure, IP.com No. IPCOM000226884D, IP.com Electronic Publication: Apr. 23, 2013, pp. 1-4.

* cited by examiner

PATTERN-BASED PRODUCT IDENTIFICATION WITH FEEDBACK

BACKGROUND OF THE INVENTION

The present invention relates generally to the field of information technology asset management, and more particularly to product identification technology.

Information technology asset management (ITAM) is a set of business practices supporting life cycle management and strategic decision making with respect to the information technology (IT) infrastructure of an organization. ITAM often includes gathering and maintaining inventory information about the hardware and software assets of an IT environment, which information is then used to drive decisions about asset purchases and dispositions. Effective use of ITAM can help organizations minimize IT costs through better planning, purchasing, and compliance.

An important aspect of ITAM is software asset management (SAM). Software asset management involves managing and optimizing the procurement, deployment, maintenance, utilization, and retirement of software applications across an organization. As a component of ITAM, SAM is typically concerned with maintaining high levels of organizational productivity while reducing IT costs and minimizing the business and legal risks associated with software ownership and use. Objectives of SAM include software license compliance, license portfolio optimization, and cybersecurity. With respect to license compliance, SAM seeks to ensure that the proper types and quantities of software license agreements are in place, and that software usage accords with the terms and conditions of those agreements. Doing so may involve conducting periodic software inventories, comparing the resulting information against licenses held, and establishing controls to ensure that proper licensing practices are maintained over time.

SUMMARY

According to an aspect of the present invention, there is a method, computer program product and/or system that performs the following steps (not necessarily in the following order): (i) receives a set of data about information technology assets in one or more asset management domains; (ii) matches a subset of the data with a first pattern of a pattern set, where the first pattern is associated with at least a first information technology product; (iii) determines, responsive to the match, that the subset of the data represents the first product associated with the first pattern; (iv) reports the determination that the subset of the data represents the first product associated with the first pattern; (v) receives feedback on the accuracy of the reported determination that the subset of the data represents the first product associated with the first pattern; and (vi) updates pattern set information in response to the feedback.

DETAILED DESCRIPTION

Figure 1:
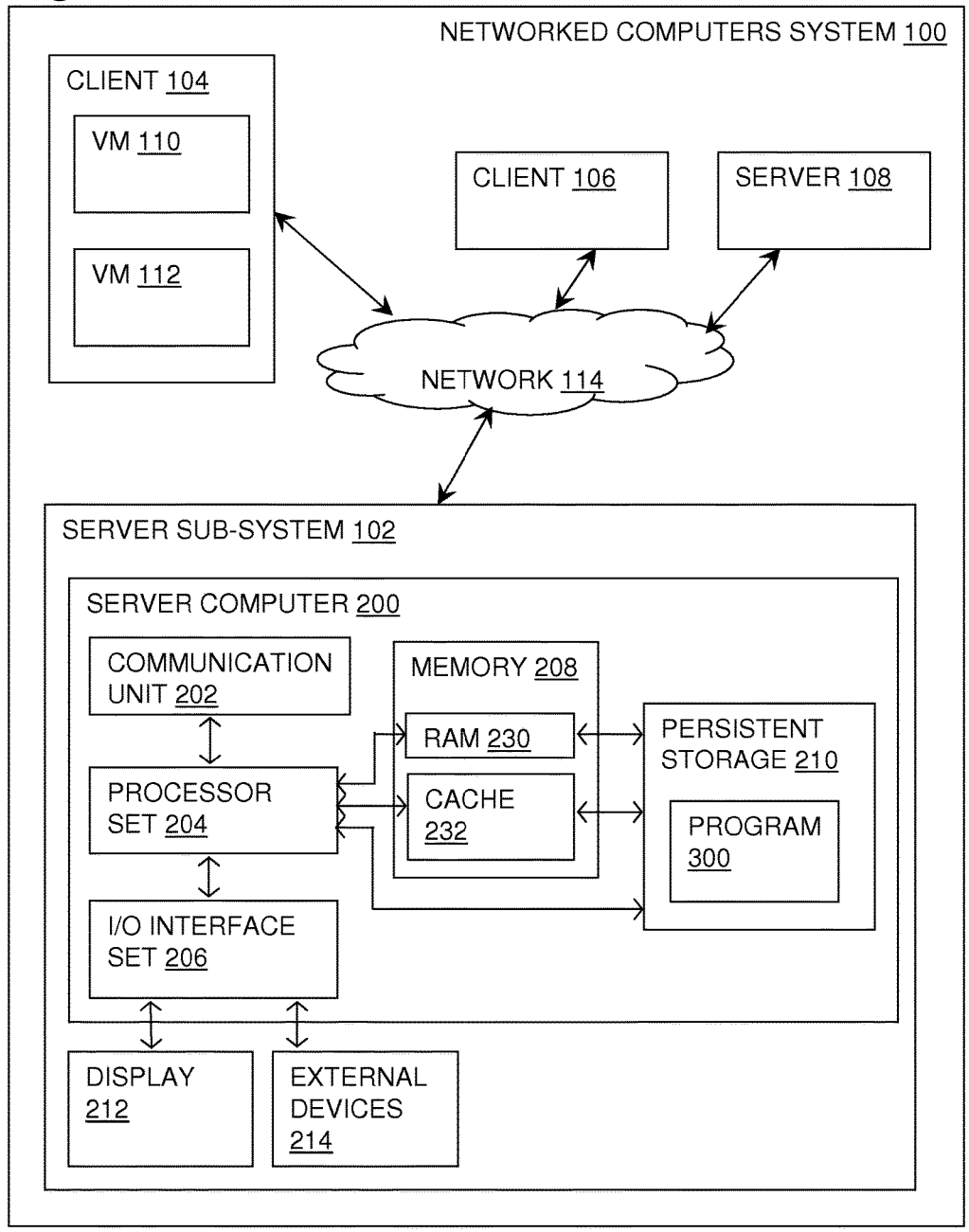
FIG. 1 is a block diagram view of a first embodiment of a system according to the present invention.

Some embodiments of the present invention automatically associate information technology resource usage patterns with specific information technology products and license rules. These embodiments then receive feedback regarding the accuracy of the automatic associations, which feedback is used to improve the accuracy of future automatic associations.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102 and 108; client sub-systems 104, and 106; virtual machines 110 and 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
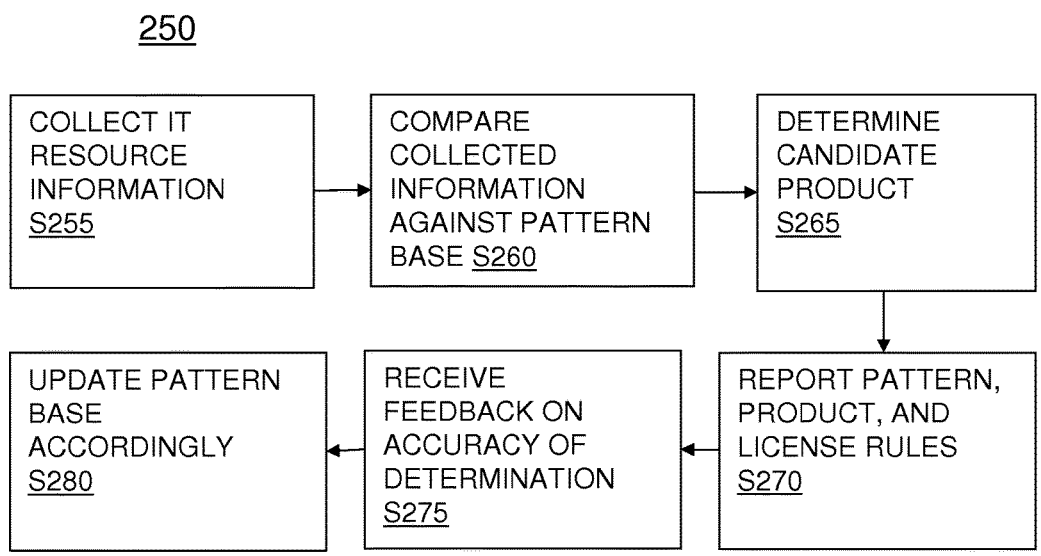
FIG. 2 is a flowchart showing a first embodiment method performed, at least in part, by the first embodiment system.
Figure 3:
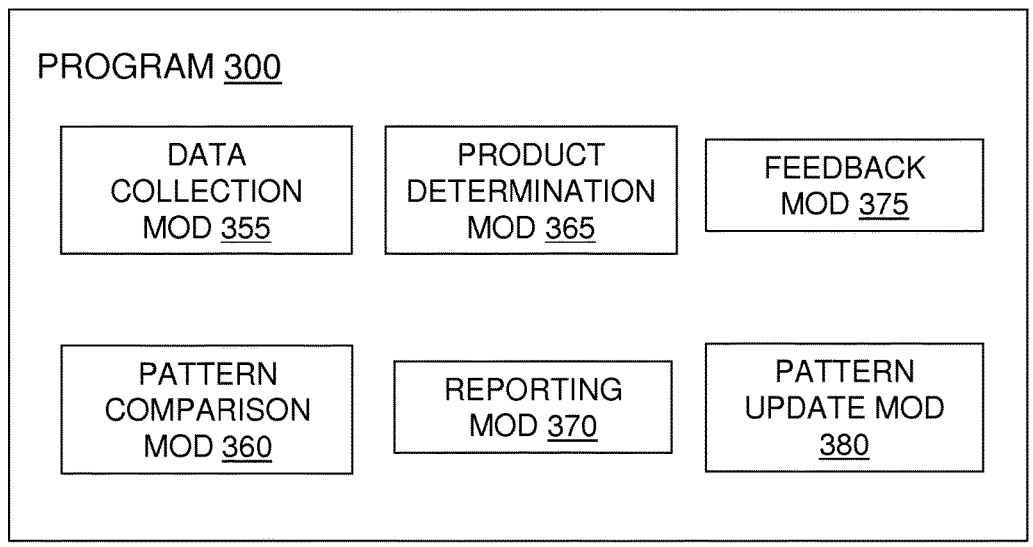
FIG. 3 is a block diagram view of a machine logic (for example, software) portion of the first embodiment system.
Figure 4:
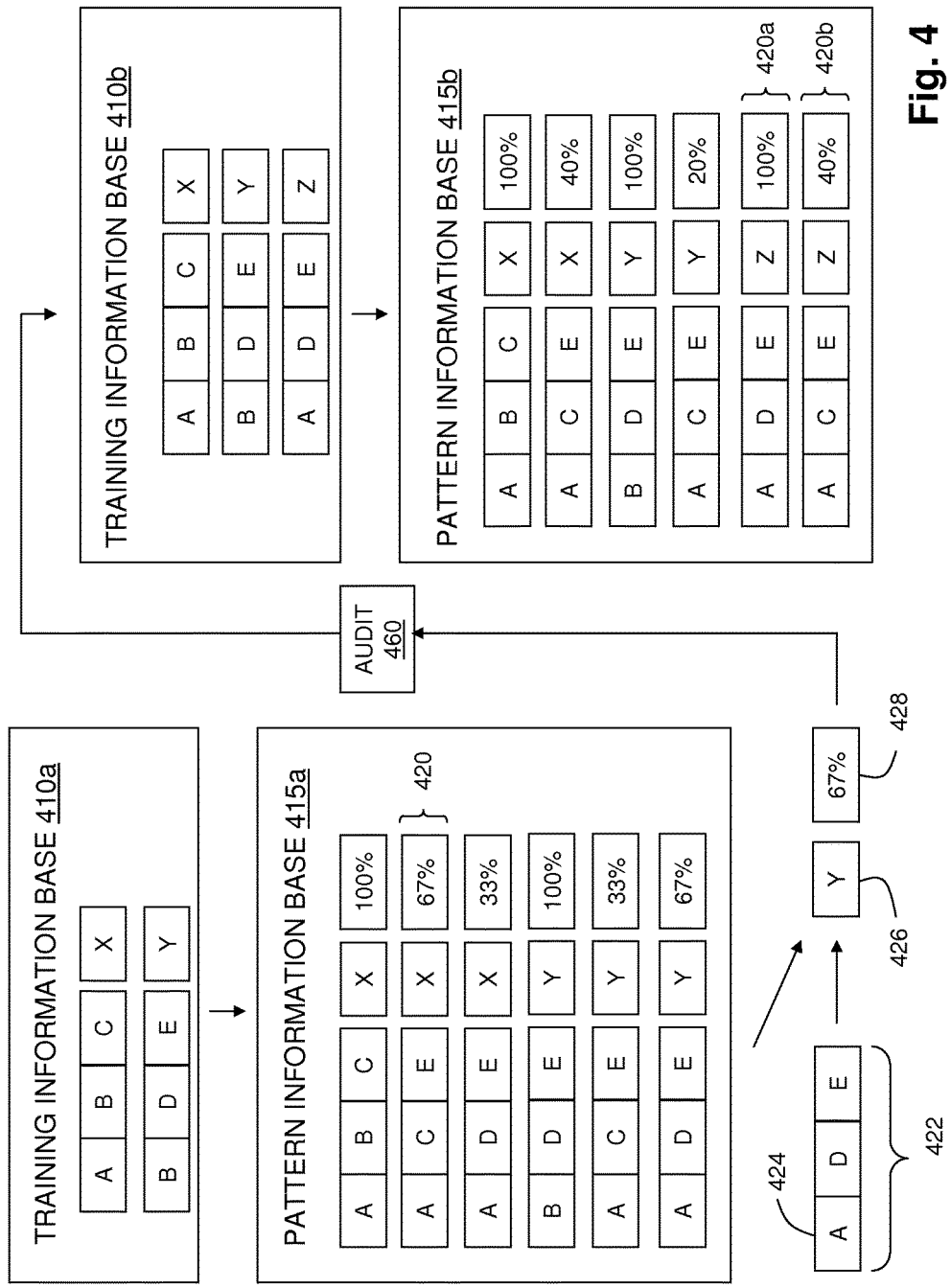
FIG. 4 is a diagram view showing information that is generated by and/or helpful in understanding the first embodiment system.

FIG. 2 shows flowchart 250 depicting a method according to the present invention. FIG. 3 shows program 300 for performing at least some of the method steps of flowchart 250. FIG. 4 shows a data flow associated with a simple example of the method in action. This method and associated software and data flow will now be discussed, over the course of the following paragraphs, with extensive reference to FIG. 2 (for the method step blocks), FIG. 3 (for the software blocks), and FIG. 4 (for the data flow).

FIG. 4 includes: a training information base at time T1 (training information base 410a); a pattern information base at time T1 (pattern information base 415a); a training information base at time T2 (training information base 410b); a pattern information base at time T2 (pattern information base 415b); and audit 460. Each information base in turn includes one or more sets 420 (including sets 420a and 420b) of patterns 422 of data items 424, together with an associated product 426 and, in the case of the pattern information base, a confidence value 428.

As a precursor to the steps presented below, training information base 410a contains a set of patterns, each known to be associated with a particular product. This information is used to construct additional patterns and/or update confidence values for existing pattern-product matches in pattern information base 415a (described in further detail below). In general, the information bases need not be separate entities, but should make a distinction between known information (for example, "software components A, B, and C were determined to make up software product X in an audit conducted in June 2014") and derived hypotheses (such as "software components A, C, and E are likely to make up software product X"). In some cases, known information may be conflicting (for example, "software components A, B, and C were determined to make up software product X in an audit conducted in June 2014 but these same components were determined to make up software product Y in an audit conducted in June 2013"). These conflicts may be dealt with through a variety of techniques, such as giving greater weight to more current and/or more frequently occurring information.

Processing begins at step S255, where data collection module ("mod") 355 collects resource usage information from an organization's information technology assets. In this embodiment, the data is collected from agents running on servers 102 and 108 and clients 104 and 106, including virtual machines 110 and 112 (see FIG. 1). The data includes information about each system component and their relationships to each other. For example, a process MyProc associated with a an open port MyPort may be running on virtual machine 112, which is associated with a single virtual CPU bound to a single-core CPU socket on client 104. More generally, the data could be of nearly any type, structured in nearly any fashion, and/or collected from nearly any type of information technology asset.

Processing proceeds to step S260, where pattern comparison mod 360 reviews the collected data against a pattern repository in an attempt to identify the various software (and/or hardware) products the collected data represents. In this simplistic example, the letters A-E represent only software components, and data collection module 355 has discovered software components A, D, and E. Pattern comparison mod 360 finds that the pattern made up of these three components is represented in a single pattern in pattern information base 415a.

Processing proceeds to step S265, where product determination mod 365 determines what product or products are likely represented by the collected data. In this case the determination is fairly straightforward because a pattern for "A, D, and E" is in pattern information base 415a and is shown to be potentially associated with only two products, X and Y. Pattern comparison mod 360 selects product Y as the most likely product represented by A, D, and E because this pattern has the highest likelihood of representing this product according to the confidence value associated with that pattern set. Alternatively, the components may have multiple matching combinations, such as A and D together and E separately, or no pattern(s) that completely encompass the collected data. Similarly, different algorithms may be employed for choosing between or among multiple existing patterns and/or multiple possible associated products, and/or new patterns (and confidence values for associated products) may be generated in these circumstances on the fly. Some components or patterns may not be matched to a product if all potentially matching products fall below some threshold confidence value.

Processing proceeds to step S270, where reporting mod 370 reports on the determination made by product determination mod 365. In this embodiment, the determination, its confidence value, and license information associated with the determined product are reported to another component of the larger software asset management system responsible for managing assets and licenses. Specifically, A, D, and E are reported as constituting product Y with a confidence of 67%, and license information associated with product Y is also communicated. Alternatively, multiple candidate products may be reported instead of a single best match, and/or product license information may be obtained from some other source.

Note that, for the purposes of this embodiment, two identical component patterns are nevertheless represented as different "products" if they have different license rules associated with them. For instance, components A, B, and D together may have represented an antivirus software product with a single-user license at some point in the past, but the same combination of components is now licensed by the organization under a multi-user license. These two uses of A, B, and D are considered to be two different products.

Processing proceeds to step S275, where feedback mod 375 accepts feedback on its determinations. In this case, audit 460 determines that A, D, and E actually represents product Z, so this information is added to the training information base (410b) as a new entry. In other cases the feedback behavior may be different or more complicated. For example, if the audit confirmed or conflicted with previously received feedback, this information would be added to training information base 410b by, for example, creating a second entry for the association and/or including audit date as additional information. In the case of feedback that conflicts with prior feedback or an otherwise established pattern-product match, feedback mod 375 might raise an alert to this effect to prompt a double-checking of audit results for the case in question.

Processing proceeds to step S280, where pattern update mod 380 updates the pattern store in the pattern information base (415b) in response to the changes made in training information base 410b. In this example, in response to the addition of pattern A, D, E as product Z to training information base 410b, this set has also been added to pattern information base 415b (together with appropriate confidence information) as set 420a, and the hypothesized associations of A, D, E with products X and Y in pattern information base 415a have been removed. Also, a new hypothesized association for A, C, E has been added as set 402b in response to recognition of the existence of a new product, product Z, and confidence values for existing possible associations of pattern A, C, E with the various products have been adjusted to account for this addition. In other scenarios, new information in training information base 410b may produce other updates. For instance, new actual or hypothesized patterns may be added to pattern information base 415b, conflicts between confirmed associations in training information base 410b may result in adjustments to confidence values of existing pattern associations rather than complete elimination of those associations, and/or alternative ways of computing confidence values may be used. In this way, program 300 uses feedback to refine its automatic determinations of software products from IT resource usage data over time.

III. Further Comments and/or Embodiments

Some embodiments of the present invention recognize that enterprise software license identification is a challenging task: (i) because of the complex and dynamic structure of software components; and/or (ii) because each component is identified under complex terms, conditions, and rules. For instance, Table 1 gives an example of how several distinct software products may share some of the same software components. Component A is a volume manager for storage systems, component B is a file system, component C provides a high-availability clustering capability, component D provides independent snapshot volume copies, component E allows multiple servers to simultaneously mount and share a file system, and component F permits concurrent access to a single database by multiple database management system instances. In addition, some of these products are capable of being combined with a separately licensable data replicator, while some of these components may also be stand-alone products themselves.

TABLE 1

Software Products by Component

| Product | Components | | | | | |
|---|---|---|---|---|---|---|
| | A | B | C | D | E | F |
| P1 | x | x | | | | |
| P2 | x | x | x | | | |
| P3 | x | x | | x | | |
| P4 | x | x | x | x | | |
| P5 | x | x | x | x | x | |
| P6 | x | x | x | x | x | x |

Moreover, each component may in turn include various processes, mount points, kernel modules, installed packages, mounted file systems, listening ports, and so on. A sample of this scenario is provided in Table 2.

TABLE 2

Software Component Parts

| Component | Process | Kernel Module | Installed Package | Mounted File System |
|---|---|---|---|---|
| A | Proc 1 | | | |
| | Proc 2 | | | |
| | Proc 3 | | | |
| B | | KM 1 | | |
| C | Proc 4 | | Package 1 | |
| E | Proc 5 | | | MFS 1 |

Figure 5:
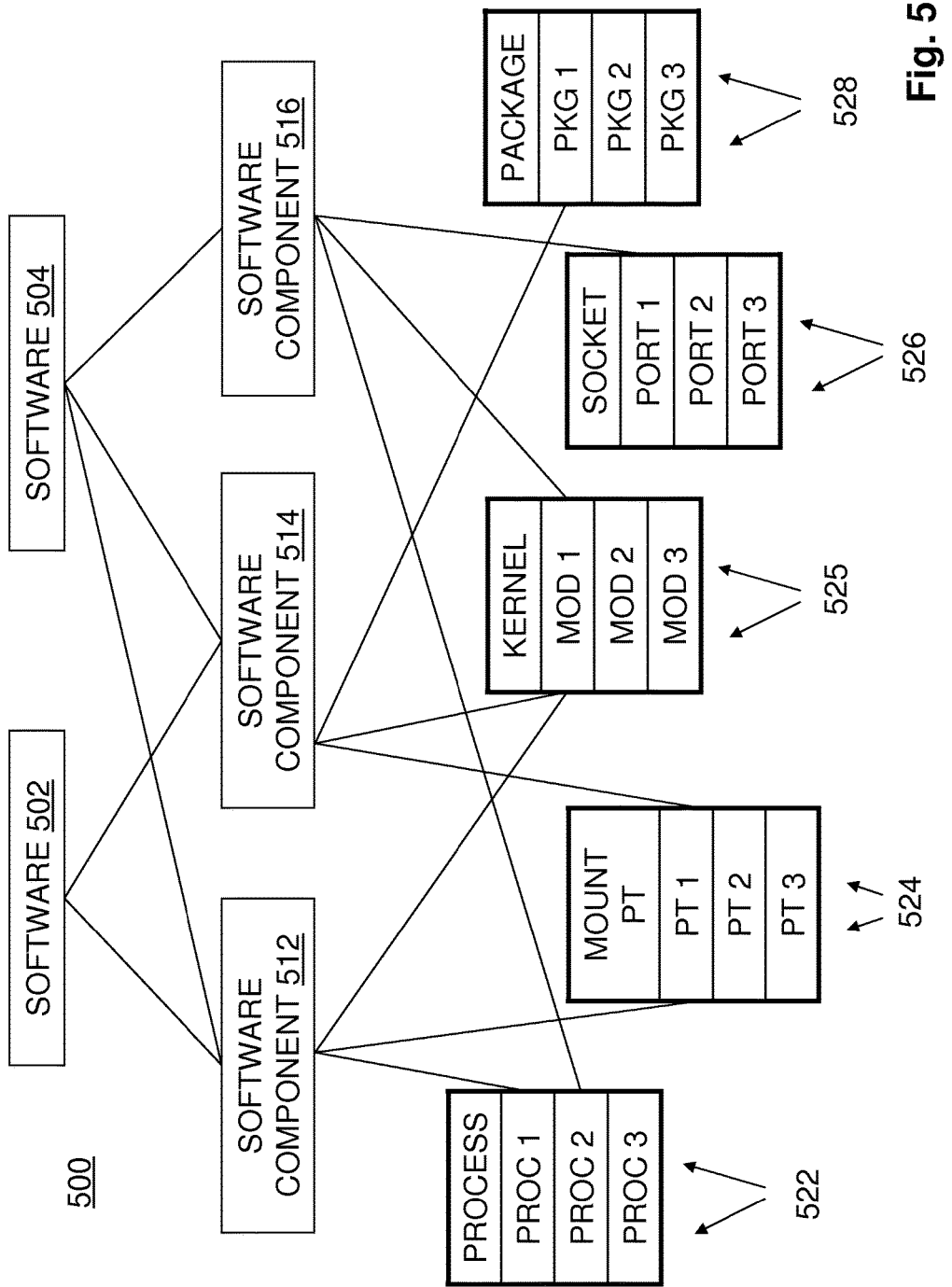
FIG. 5 is a graph view showing information that is generated by and/or helpful in understanding embodiments of the present invention.

FIG. 5 contains diagram 500, which provides a stylized graphic illustration of this situation. Diagram 500 includes: software products 502 and 504; software components 512, 514, and 516; and processes 522, mount points 524, kernels 525, sockets 526, and packages 528. As can be seen from this fairly simplistic diagram, relationships between product components can be complex and non-exclusive.

Figure 6:
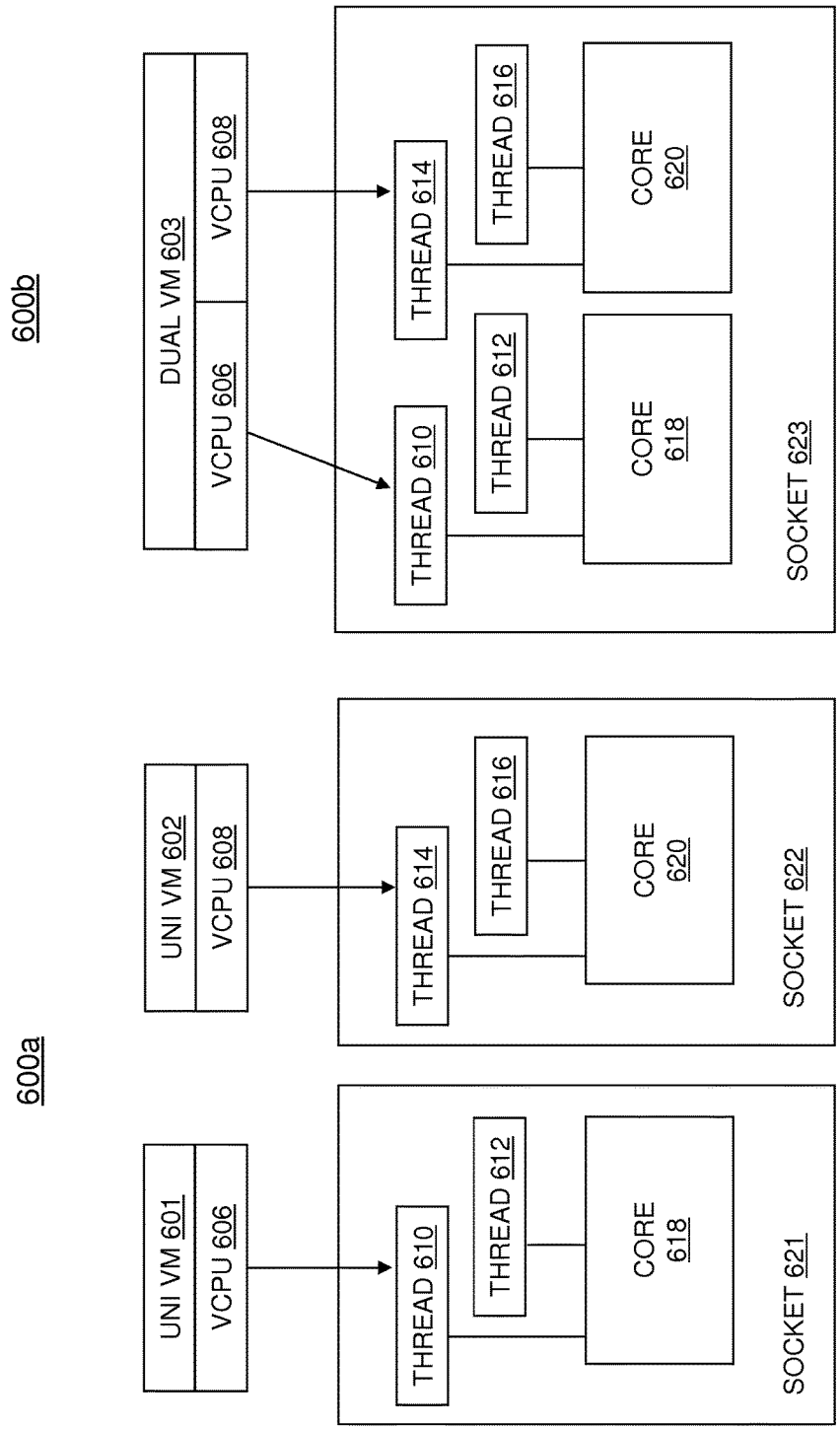
FIG. 6A is a first diagram view showing information that is generated by and/or helpful in understanding embodiments of the present invention.
FIG. 6B is a second diagram view showing information that is generated by and/or helpful in understanding embodiments of the present invention.

Some embodiments of the present invention recognize that to complicate matters still further, license documents are often incomplete and/or ambiguous. For instance, different vendors usually have different terms for the same concept, like "CPU," or "processor," and in a rapidly evolving technological landscape, even terms that may have been clear in the past may no longer be so clear in the present. Consider FIGS. 6A and 6B, illustrating alternative computer architectural scenarios 600a and 600b, respectively. Architecture 600a includes: (unitary) virtual machines 601 and 602; virtual CPUs 606 and 608; threads 610, 612, 614, and 616; cores 618 and 620; and sockets 621 and 622. Architecture 600b, like architecture 600a, includes: virtual CPUs 606 and 608; threads 610, 612, 614, and 616; and cores 618 and 620; but has dual virtual machine 603 in place of unitary virtual machines 601 and 602, and single socket 623 in place of sockets 621 and 622. How many "processors" does each architecture include? How many "CPUs"? Suppose a license agreement speaks of the need to separately license each "hardware thread" that is simultaneously mapped to a "virtual core." What items, if any, do these terms map to in architectures 600a and 600b? Are architectures 600a and 600b equivalent with respect to this agreement?

Some embodiments of the present invention recognize that such complexities and ambiguities: (i) discourage the use of efficient and/or alternative licensing scenarios, such as sub-capacity licensing (e.g., licensing an eligible software product for less than the full capacity of a server, providing the granularity needed to efficiently apply licenses to various multi-core chip and virtualization technologies); and/or (ii) can result in significant time and effort for validation of license compliance. They further recognize that current practice is inaccurate and/or incurs heavy manual work, where: (i) manual checks are done to determine each type of resource a software system is using; and/or (ii) software documentation is manually studied to find the differences between different editions or variations of software products.

In recognition of the above facts, potential problems and/or potential areas for improvement with respect to the current state of the art, some embodiments of the present invention provide an automatic software discovery engine that may include one, or more, of the following features, characteristics and/or advantages: (i) uses pattern-based analysis to identify enterprise software with complicated component combinations; (ii) includes automatic pattern training and refinement to avoid the heavy manual work otherwise required to identify software products; (iii) receives feedback from a front-end system and uses it to update the training set to improve the accuracy of a pattern information base; (iv) includes endpoint agents that collect resource usage information on each computer; and/or (v) includes a decision-making component that takes advice and provides feedback.

The use of pattern-based analysis is recognized by some embodiments of the present invention to be complementary or superior to pure rule-based analysis in at least some circumstances, because analysis is based on similarity to prior factual circumstances rather than on comparison to abstract rules. Pattern-based analysis can be particularly beneficial when currently relevant fact patterns were not contemplated at the time the rules (for example, license agreements) were written. Similarly, some embodiments of the present invention recognize that feedback can be helpful in improving the accuracy of pattern-based analysis, whether by helping to point out what factual distinctions matter or by adapting the analysis to changing rules (or interpretations thereof) over time.

In some embodiments of the present invention, such an automatic software discovery engine is used to complement current rule-based license management systems, including software license compliance engines and/or software license optimization engines, such as those disclosed in U.S. patent application publications US 20140108403 A1, "License Reconciliation with Multiple License Types and Restrictions," and US 20140122348 A1, "Optimized License Procurement," both hereby incorporated herein by reference.

Figure 7:
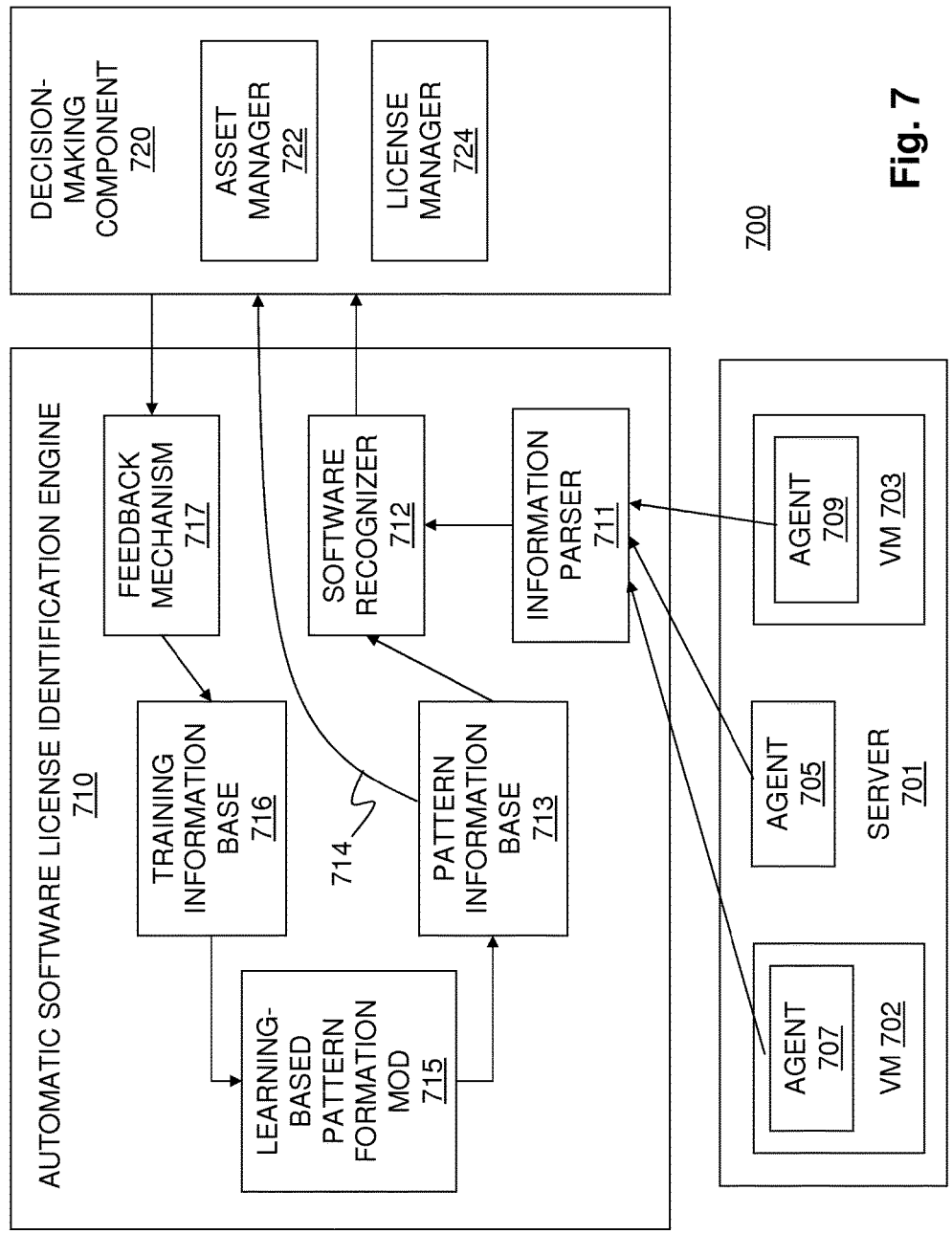
FIG. 7 is a diagram view of a second embodiment of a system according to the present invention.

Shown in FIG. 7 is system 700, illustrating an embodiment of the present invention. System 700 includes: server 701, including virtual machines 702 and 703, each of the three containing one of agents 705, 707, and 709; automatic software license identification engine 710, including information parser 711, software recognizer 712, pattern information base 713 (including license coverage rules 714), learning-based pattern formation mod 715, training information base 716, and feedback mechanism 717; and decision-making component (front-end software management system) 720, including asset manager 722 and license manager 724.

In system 700, information parser 711 collects resource usage information from agents 705, 707, and 709 and parses the raw data into formatted data. The formatted information is then passed to software recognizer 712, which identifies a software product (or products) the data represents by searching for a matching resource pattern (or patterns) in pattern information base 713 and loads software product information for the best match into front-end software management system 720. The match does not need to be an exact match—pattern matching algorithms such as clustering can be used to derive a match probability. Once the best match is identified, front-end software management system 720 uses this information, together with license coverage rules 714, for asset and license management, including license compliance and optimization analyses and audits. In some embodiments, data passed to the software recognizer is grouped as different resources and states in the computer system, and the number of resource types is limited. For instance, CPUs, cores, software packages, and processes may all be defined as types of resources.

The results of the management operations performed by front-end software management system 720 are fed back into automatic software license identification engine 710 via feedback mechanism 717 and used to update training information base 716, a data store for verified matchings between software products and formatted data from agents 705, 707, and 709. Each matching is verified a priori or from a user rating mechanism that rates the matching between a software product and a pattern. The verified matchings are fed into learning-based pattern formation mod 715, which uses them to form possible alternative, license-compliant patterns based on machine learning. Each pattern includes a set of typical resources of each resource type. For example, in a "process" resource type, a process named "MyProcess" may be part of a pattern. Every possible combination of resources does not need to be searched or maintained, but only the most frequent pattern(s) of software in a given data set. For example, if 98% of instances of a software product named "My Storage System" include a process named " . . . /xxx", this process is a part of a pattern(s) identifying that software product. The patterns are stored in pattern information base 713, a data store for matchings between resource patterns and software products. Each matching in pattern information base 713 also maintains an associated accuracy value representing the accuracy with which that pattern defines a product. The rating of a matching feeds back to impact the accuracy value of a pattern.

Past software audits are the main events recorded by automatic software license identification engine 710 via feedback mechanism 717, including audit timing and conclusions reached. The corresponding scenario information is also recorded, including hardware configurations, resource usage information, and license entitlements. In this way, software audits provide real evidence of what scenarios are considered compliant. While it's possible for a vendor or internal auditor to miss a non-compliance situation (or, alternatively, to incorrectly conclude a situation is non-compliant), maintaining a record of past audits and comparing these against new results provides quantitative support with statistics that can help flag tentative results that are suspect. This will in turn improve audit quality by reducing auditing errors.

In some embodiments of the present invention, information exchange with vendors is also recorded. In some embodiments, one or more of the following types of user interactions are supported: (i) uncertain entries are returned for a user to verify, with verification results being fed back into the model; (ii) a user can configure trust levels of events, such as statements made by different contact people at the vendor; (iii) a user can configure trust levels of collected data entries (for example, a kernel module is more trustable than a license key); and/or (iv) a user can remove certain events from the model, for example in the case of a license terms and conditions change, where the prior audited match is thus no longer accurate with respect to current terms and conditions.

Some embodiments of the present invention recognize that automatic enterprise software discovery is a difficult task because: (i) enterprise software commonly consists of multiple components and consumes multiple computer resources (for example, processes, mount points, kernel modules, installed packages, and/or listening ports); (ii) different editions of the same enterprise software may utilize similar resources; (iii) multiple software components can be combined as a more advanced software product; and/or (iv) current enterprise software discovery requires heavy manual work by software experts to: (a) check each type of resource that software is using, and/or (b) study software documents to find the differences between different software editions.

Some embodiments of the present invention recognize that automatic enterprise software discovery is crucial, especially in cloud environments, for purposes that may include: (i) asset management; (ii) license compliance; and/or (iii) security compliance.

Some embodiments of the present invention may include one, or more, of the following features, characteristics and/or advantages: (i) automatically identify a software license requirement and provides evidence from past cases to identify matches, where identification is based on the usage of software products and/or the license coverage rule (applicability and/or quantity requirements); (ii) the identification of software product usage includes: (a) mapping discovered information technology information to product components such as process, mount point, kernel module, socket, installed package, and so on, and/or (b) mapping product components to higher level products; and/or (iii) enable a user to configure a desired confidential level and automatically provide product identification for resource patterns that match a product with at least the threshold confidence level.

Some embodiments of the present invention may include one, or more, of the following features, characteristics and/or advantages: (i) are based on resource patterns (such as process, kernel, and so on); (ii) involve decisions about purchasing and deploying licenses; (iii) find resource patterns; (iv) helps users make decisions; (v) do not assume license requirements are known; (vi) do not assume software discovery has already been done by some other system; (vii) include a comprehensive set of discovery information, which may be collected by discovery scripts or monitoring engines that can obtain multiple types of information from a computer system, which information can then be grouped as different resources; (viii) base their determination on information from historic cases; (ix) are based on dynamic metrics, such as process lists, installed packages, kernel module information, network interface details, registry information, mount points, and so forth.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Product, information technology product: a collection of one or more information technology assets collectively governed by a license or other usage or ownership agreement; may include tangible and/or intangible items, and/or services.

What is claimed is:

1. A method comprising:
   receiving, from an information parser, a resource usage data set including information indicative of resource usage in a set of computer(s) by a first user;
   detecting, by a software recognizer and pattern information base, an unverified match between a first set of pattern(s) and the resource usage data set;
   determining, by the software recognizer, that a first piece of software is likely being used based on detection of the unverified match;
   responsive to the determination that a first piece of software is likely being used, receiving, from the first user by a learning-based pattern formation module, user input including information that the first piece of software was actually being used at the time of the determination that the first piece of software was likely being used to obtain a first verified match; and
   revising, by machine logic of the learning-based pattern formation module, the first set of pattern(s) based, at least in part, upon the user input indicative of the verified match.

2. The method of claim 1 further comprising:
   performing, by a front-end software management system, asset and license management based upon license coverage rules and the determination that the first piece of software is likely being used.

3. A method comprising:
   receiving, from an information parser, a resource usage data set including information indicative of resource usage in a set of computer(s) by a first user;
   detecting, by a software recognizer and pattern information base, an unverified match between a first set of pattern(s) and the resource usage data set;
   determining, by the software recognizer, that a first piece of software is likely being used based on detection of the unverified match;
   responsive to the determination that a first piece of software is likely being used, receiving, from the first user by a learning-based pattern formation module, user input including information that the first piece of software was actually being used at the time of the determination that the first piece of software was likely being used to obtain a first verified match;
   configuring a confidence level value based upon user input; and
   configuring, based on input received from the first user, trust levels corresponding to a first statement made by a first contact person associated with the first piece of software.

4. A computer program product comprising:
   a machine readable storage device; and
   computer code stored on the machine readable storage device, with the computer code including instructions for causing a processor(s) set to perform operations including the following:
      receiving, from an information parser, a resource usage data set including information indicative of resource usage in a set of computer(s) by a first user,
      detecting, by a software recognizer and pattern information base, an unverified match between a first set of pattern(s) and the resource usage data set,
      determining, by the software recognizer, that a first piece of software is likely being used based on detection of the unverified match,
      responsive to the determination that a first piece of software is likely being used, receiving, from the first user by a learning-based pattern formation module, user input including information that the first piece of software was actually being used at the time of the determination that the first piece of software was likely being used to obtain a first verified match,
      revising, by machine logic of the learning-based pattern formation module, the first set of pattern(s) based, at least in part, upon the user input indicative of the verified match, and
      configuring, based on input received from the first user, a trust level for use by the software recognizer in its determination that a first piece of software is likely being used.

5. The computer program product of claim 4 wherein the computer code further includes instructions for causing the processor(s) set to perform the following operations:
   performing, by a front-end software management system, asset and license management based upon license coverage rules and the determination that the first piece of software is likely being used.

6. The computer program product of claim 4 wherein the computer code further includes instructions for causing the processor(s) set to perform the following operations:
   configuring a confidence level value based upon user input; and configuring, based on input received from the first user, trust levels corresponding to a first statement made by a first contact person associated with the first piece of software.

7. The computer program product of claim 4 further comprising the processor(s) set, wherein the computer program product is in the form of a computer system.

\* \* \* \* \*